(12) United States Patent
Ichikawa et al.

(10) Patent No.: US 7,073,861 B2
(45) Date of Patent: Jul. 11, 2006

(54) HINGE CONSTRUCTION FOR SEAT BACK

(75) Inventors: Masato Ichikawa, Hamamatsu (JP); Toru Hirano, Hamamatsu (JP); Akira Hijikata, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 10/818,847

(22) Filed: Apr. 6, 2004

(65) Prior Publication Data

US 2004/0201265 A1  Oct. 14, 2004

(30) Foreign Application Priority Data

Apr. 9, 2003  (JP) .............................. 2003-104933

(51) Int. Cl.
  *B60N 2/02* (2006.01)
(52) U.S. Cl. .............................. 297/378.1; 297/378.12; 297/378.13; 297/463.1
(58) Field of Classification Search ............ 297/378.1, 297/378.12, 378.13, 440.1, 463.1, 354.1, 297/440.15, 440.2; 296/65.1, 65.16; 16/386, 16/273
See application file for complete search history.

(56) References Cited

U.S. PATENT DOCUMENTS

| 4,847,950 | A | * | 7/1989 | Coleman ...................... 16/363 |
| 5,273,336 | A | * | 12/1993 | Schubring et al. ........ 295/65.17 |
| 5,577,295 | A | * | 11/1996 | Papke et al. .................. 16/254 |
| 5,582,453 | A | | 12/1996 | Leuchtmann et al. ...... 296/65.1 |
| 5,685,612 | A | * | 11/1997 | MacDonald et al. ..... 297/378.1 |
| 5,700,058 | A | * | 12/1997 | Balagurumurthy et al. ...... 297/440.15 |
| 5,716,100 | A | * | 2/1998 | Lang ..................... 297/378.12 |
| 5,741,046 | A | * | 4/1998 | Leuchtmann et al. .. 297/378.13 |
| 6,174,030 | B1 | | 1/2001 | Matsuo ................... 297/463.1 |

FOREIGN PATENT DOCUMENTS

| DE | 296 20 145 U 1 | 2/1997 |
| DE | 198 37 543 C 1 | 1/1999 |
| DE | 199 12 811 A 1 | 7/1999 |
| DE | 199 46 117 C 1 | 7/2000 |
| EP | 0 671 292 B1 | 2/1995 |
| JP | 09-226426 | 9/1997 |

* cited by examiner

*Primary Examiner*—Peter M. Cuomo
*Assistant Examiner*—Erika Garrett
(74) *Attorney, Agent, or Firm*—Trop, Pruner & Hu, P.C.

(57) ABSTRACT

A hinge construction in which a center hinge 14 is provided between seat backs 1 and 2 arranged by being divided into left and right, and the left and right seat backs 1 and 2 are supported by the center hinge 14 so as to be reclinable. In this hinge construction, the center hinge 14 includes a mounting bracket 18 of which one end portion is installed to the right seat back 2, a center hinge bracket 19 installed to the vehicle body side, and a hinge shaft 20 for connecting the mounting bracket 18 to the center hinge bracket 19. The left and right seat backs 1 and 2 are supported via the center hinge 14 so as to be reclinable by inserting the hinge shaft 20 through the other end portion of the mounting bracket 18 and the center hinge bracket 19 and by fixing the hinge shaft 20 to a seat frame 3 of the left seat back 1.

2 Claims, 6 Drawing Sheets

HINGE CONSTRUCTION FOR SEAT BACK

BACKGROUND OF THE INVENTION AND RELATED ART STATEMENT

1. Field of the Invention

The present invention relates to a hinge construction for a split-type seat back, which is disposed between right and left seat backs.

2. Description of Related Art

Some vehicular rear seats are of a type such that a seat back is divided into right and left. Such a split-type seat back is arranged so that each seat back can be reclined-forward via a center hinge etc. In a hinge construction for such a seat back, a mounting bracket is installed at a side of each of the seat backs divided into right and left, and a center hinge bracket is installed on the vehicle body floor side. By inserting a connecting pin in hinge holes of the mounting bracket and the center hinge bracket, the right and left seat backs can be reclined while being connected to each other (for example, see Patent Document 1).

[Patent Document 1] Japanese Patent Provisional Publication No. 9-226426 (No. 226426/1997)

Also, in the split-type seat back, the seat back is divided in a ratio of 6:4 to improve seat comfort of a passenger seated in the center. The split-type seat back in which the right and left seat backs have a different width has become mainstream. For the seat back of this type, when a load is applied from the outside, a high moment load is applied to a hinge portion of the wider seat back, which is formed at the ratio of 6.

A center hinge portion provided between the right and left seat backs (at the boundary position) must have a sufficient strength because it supports the right and left seat backs that recline forward. In order to increase the strength of the center hinge portion, it is preferable that a connecting pin be directly fastened to a frame of the seat back by inserting the connecting pin in a hinge hole in a center hinge bracket and in the frame of the seat back without the use of a mounting bracket.

However, in the hinge construction in which the connecting pin is directly fastened to the frame of the seat back, since the center hinge portion is provided between the right and left seat backs, parts are unable to be laid out, or installation work must be done in a tight space for the reason that a tightening tool cannot be inserted depending on the construction of the center hinge portion or for other reasons, which presents a problem in that work efficiency cannot be improved.

OBJECT AND SUMMARY OF THE INVENTION

The present invention has been made in view of the above situation, and accordingly an object thereof is to provide a hinge construction for a seat back, in which the strength of installation of seat back to a center hinge can be increased and work efficiency can be improved by a simple construction.

To solve the above-described problem with the prior art, the present invention provides a hinge construction for a seat back, in which a center hinge is provided between seat backs arranged by being divided into right and left, and the right and left seat backs are supported by the center hinge so as to be turnable, wherein the center hinge includes a mounting bracket of which one end portion is installed to one seat back, a center hinge bracket installed to the vehicle body side, and a hinge shaft for connecting the mounting bracket to the center hinge bracket; and the right and left seat backs are supported via the center hinge so as to be turnable by inserting the hinge shaft through the other end portion of the mounting bracket and the center hinge bracket and by fixing the hinge shaft to a seat frame of the other seat back.

In the present invention, the hinge shaft is formed by a shoulder bolt having a large-diameter portion and a small-diameter portion, and is configured so that a shoulder is in contact with the side surface of the seat frame of the seat back in a state in which the hinge shaft is tightened and fixed.

Also, in the present invention, the other end portion of the mounting bracket and the center hinge bracket each are provided with a through hole through which a cylindrical collar is installed, and the hinge shaft is arranged by being inserted in the collar.

Further, in the present invention, a child seat attachment member extending in the transverse direction is fixed to the center hinge bracket.

Also, in the present invention, the collar is formed with an engagement portion for holding the other end portion of the mounting bracket.

Further, in the present invention, the right and left seat backs are in a different division ratio, and the other seat back is formed so as to be wider than one seat back.

As described above, the hinge construction for a seat back in accordance with the present invention is a hinge construction in which a center hinge is provided between seat backs arranged by being divided into right and left, and the right and left seat backs are supported by the center hinge so as to be turnable, wherein the center hinge includes a mounting bracket of which one end portion is installed to one seat back, a center hinge bracket installed to the vehicle body side, and a hinge shaft for connecting the mounting bracket to the center hinge bracket; and the right and left seat backs are supported via the center hinge so as to be reclinable by inserting the hinge shaft through the other end portion of the mounting bracket and the center hinge bracket and by fixing the hinge shaft to a seat frame of the other seat back. Therefore, the center hinge is directly installed to the seat frame of seat back by a simple construction, so that the installation strength can be increased, and also work efficiency can be improved by quick installation work.

In the hinge construction in accordance with the present invention, if the hinge shaft is formed by a shoulder bolt, and is configured so that a shoulder is in contact with the side surface of the seat frame of the seat back in a state in which the hinge shaft is tightened and fixed, an installation portion of the hinge shaft and the seat frame of the seat back can be made stable.

Also, in the hinge construction in accordance with the present invention, if the other end portion of the mounting bracket and the center hinge bracket each are provided with a through hole through which a cylindrical collar is installed, and the hinge shaft is arranged by being inserted in the collar, the hinge shaft can be turned smoothly, and hence the operability of tilting the seat back can be improved.

Further, in the hinge construction in accordance with the present invention, if a child seat attachment member extending in the transverse direction is fixed to the center hinge bracket, the installation strength of the child seat attachment member can further be increased, and further the vehicle body floor to which the seat back is installed can be reinforced.

Also, in the hinge construction in accordance with the present invention, if the collar is formed with an engagement portion for holding the other end portion of the mounting bracket, the mounting bracket can be held temporarily by the center hinge bracket when the center hinge is assembled, so that the work efficiency can further be improved.

Further, in the hinge construction in accordance with the present invention, if the right and left seat backs are made in a different division ratio, and thereby the other seat back is formed so as to be wider than one seat back, the installation strength of the seat back having a high division ratio, to which a high moment load is applied, can be increased.

DETAILED DESCRIPTION OF PREFERRED EMBODIMENTS

Figure 1:
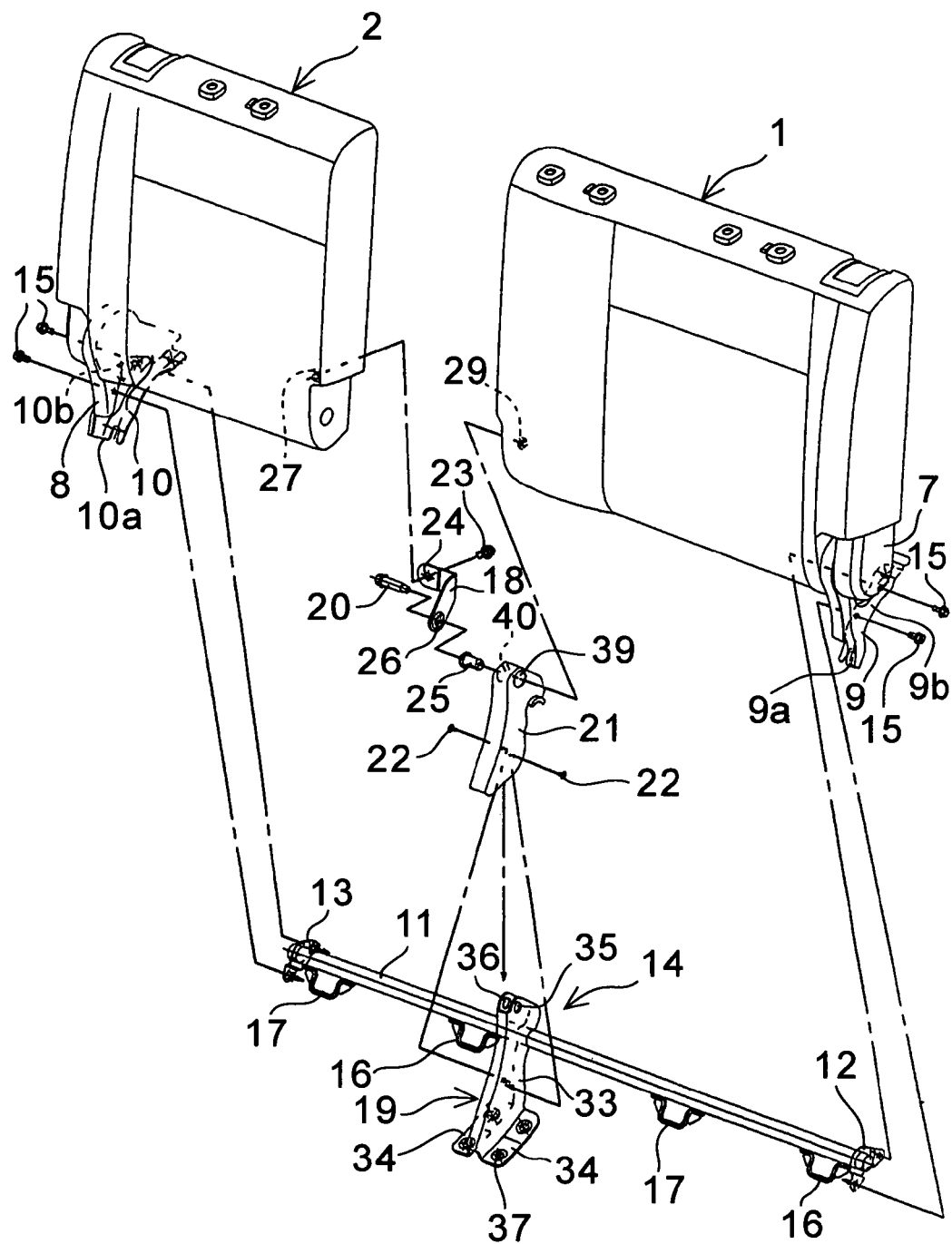
FIG. 1 is a perspective view showing a state before a split-type seat back to which a hinge construction in accordance with an embodiment of the present invention is applied is installed.
Figure 2:
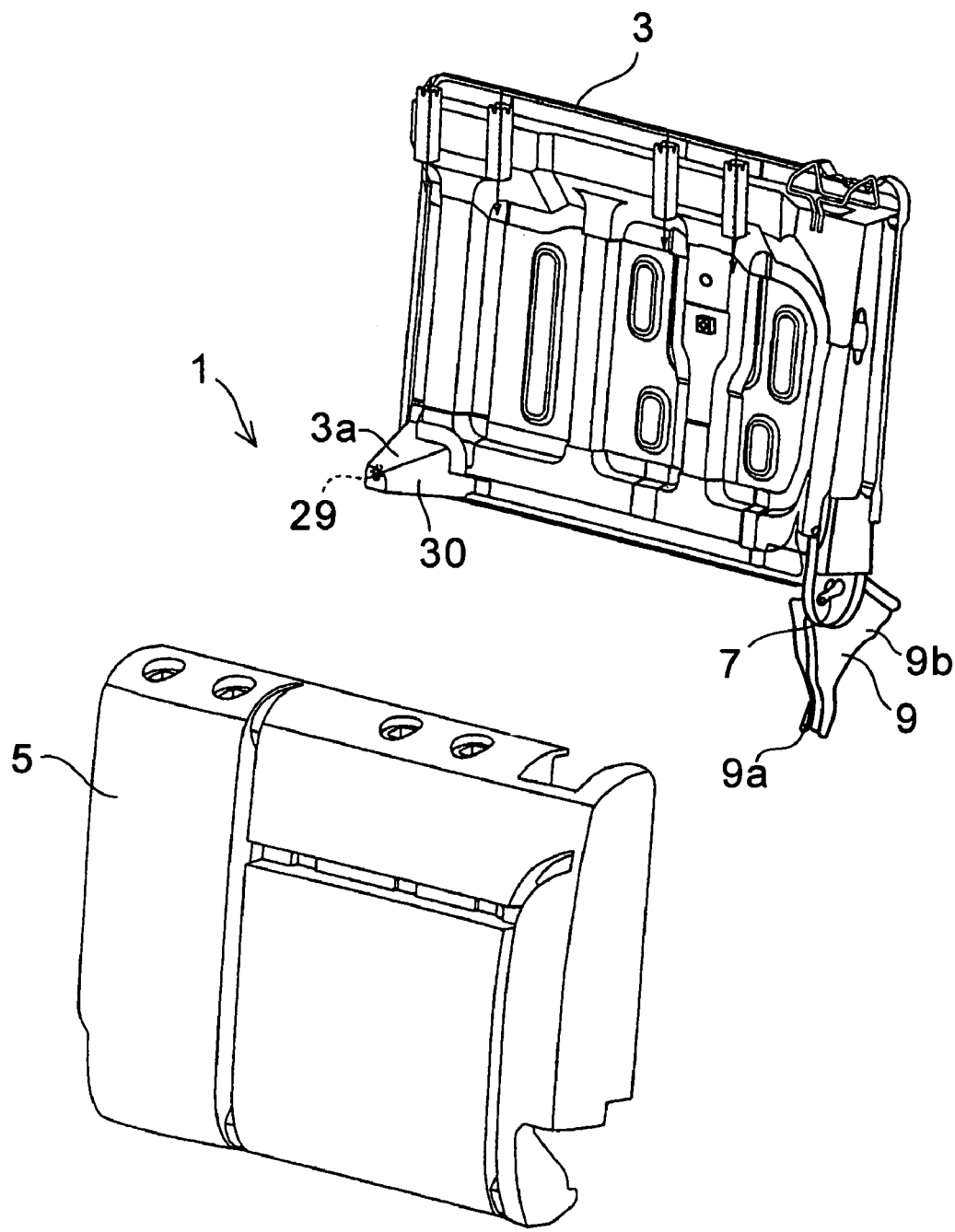
FIG. 2 is a perspective view showing a state in which, of the seat backs shown in FIG. 1, a wider seat back is disassembled into a seat back foam and a seat frame.

The present invention will now be described in detail with reference to an embodiment shown in the accompanying drawings. The front, rear, right, and left in this specification are defined with the vehicle body being the reference, and the left and right directions are reverse to those in the drawings.

FIGS. 1 to 7 show an embodiment of a hinge construction for a seat back in accordance with the present invention. Seat backs 1 and 2 to which the hinge construction of this embodiment is applied constitute a rear seat provided at the rear in a cabin of a vehicle, and are arranged by being divided in the transverse direction in a different division ratio (in this embodiment, in a ratio of 6:4). Therefore, the left seat back 1 is formed so as to be wider than the right seat back 2. As shown in FIGS. 1 to 5, the left and right seat backs 1 and 2 each are formed by a seat frame 3, 4 and a seat back foam 5, 6 covering the seat frame 3, 4, and they are connected to each other by reclining devices 7 and 8, support brackets 9 and 10, a child seat attachment member 11, and side brackets 12 and 13, which are provided on the outside in the vehicle width direction of the seat backs 1 and 2, and a center hinge 14, which is provided on the inside in the vehicle width direction of the seat backs 1 and 2, and the like elements, and are supported so as to be reclinable.

Specifically, the outside in the vehicle width direction of the left and right seat backs 1 and 2 is fixed to a vehicle body floor (not shown) via the reclining device 7, 8 and the support bracket 9, 10, and the side bracket 12, 13 is fixed to the support bracket 9, 10 with a bolt 15. The front and rear end portions of the floor attachment face 9a, 10a of the support bracket 9, 10 are bolted to the vehicle body floor (not shown), and the side bracket 12, 13 is fixed by bolting to a wall portion 9b, 10b located in an intermediate portion held between the front and rear end portions of floor attachment face of the support bracket 9, 10. The child seat attachment member 11 extends in the vehicle width direction, and both ends thereof are fixed to the support brackets 9 and 10 via the side brackets 12 and 13. An intermediate portion of the child seat attachment member 11 is fixed by welding to the rear end of both right and left side surfaces of a center hinge bracket 19. The child seat attachment member 11 is provided with two sets of paired strikers 16 and 17 with an interval being provided therebetween in the transverse direction. The striker 16, 17 is formed using a hat-shaped shaft member, and engages with a latch (not shown) provided on the child seat side, by which a child seat is installed.

Figure 3:
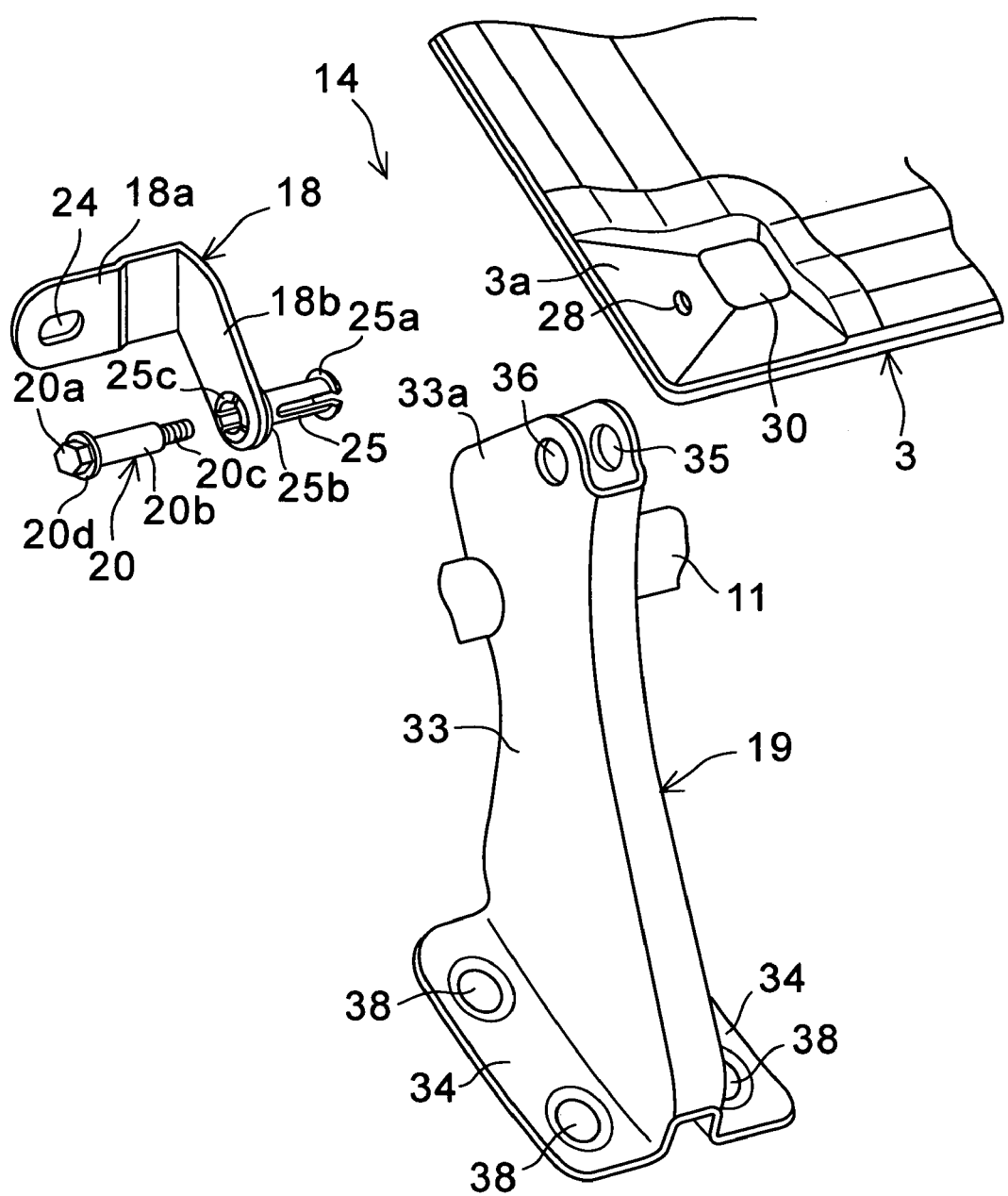
FIG. 3 is a perspective view showing the positional relationship between a seat frame of a wider seat back of the seat backs shown in FIG. 1, a mounting bracket, and a center hinge bracket.
Figure 4:
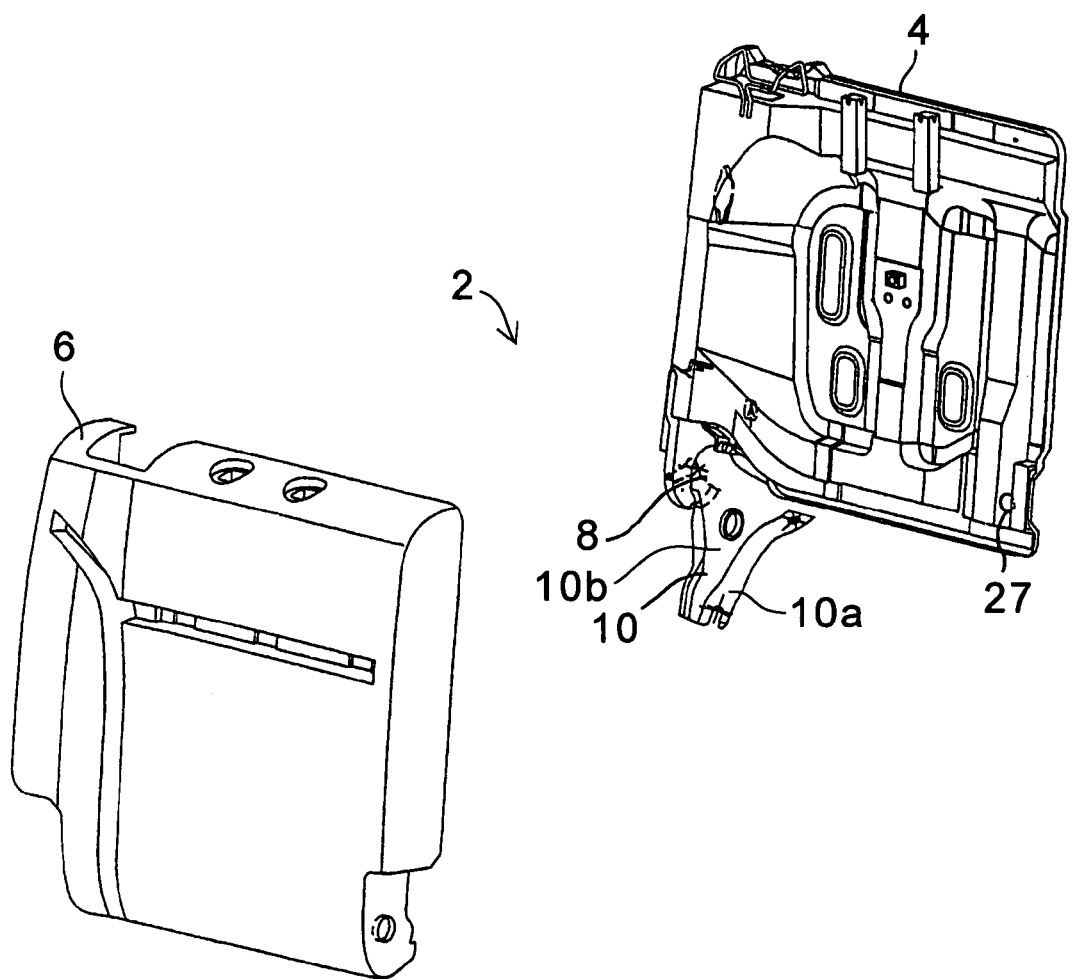
FIG. 4 is a perspective view showing a state in which, of the seat backs shown in FIG. 1, a narrower seat back is disassembled into a seat back foam and a seat frame.
Figure 5:
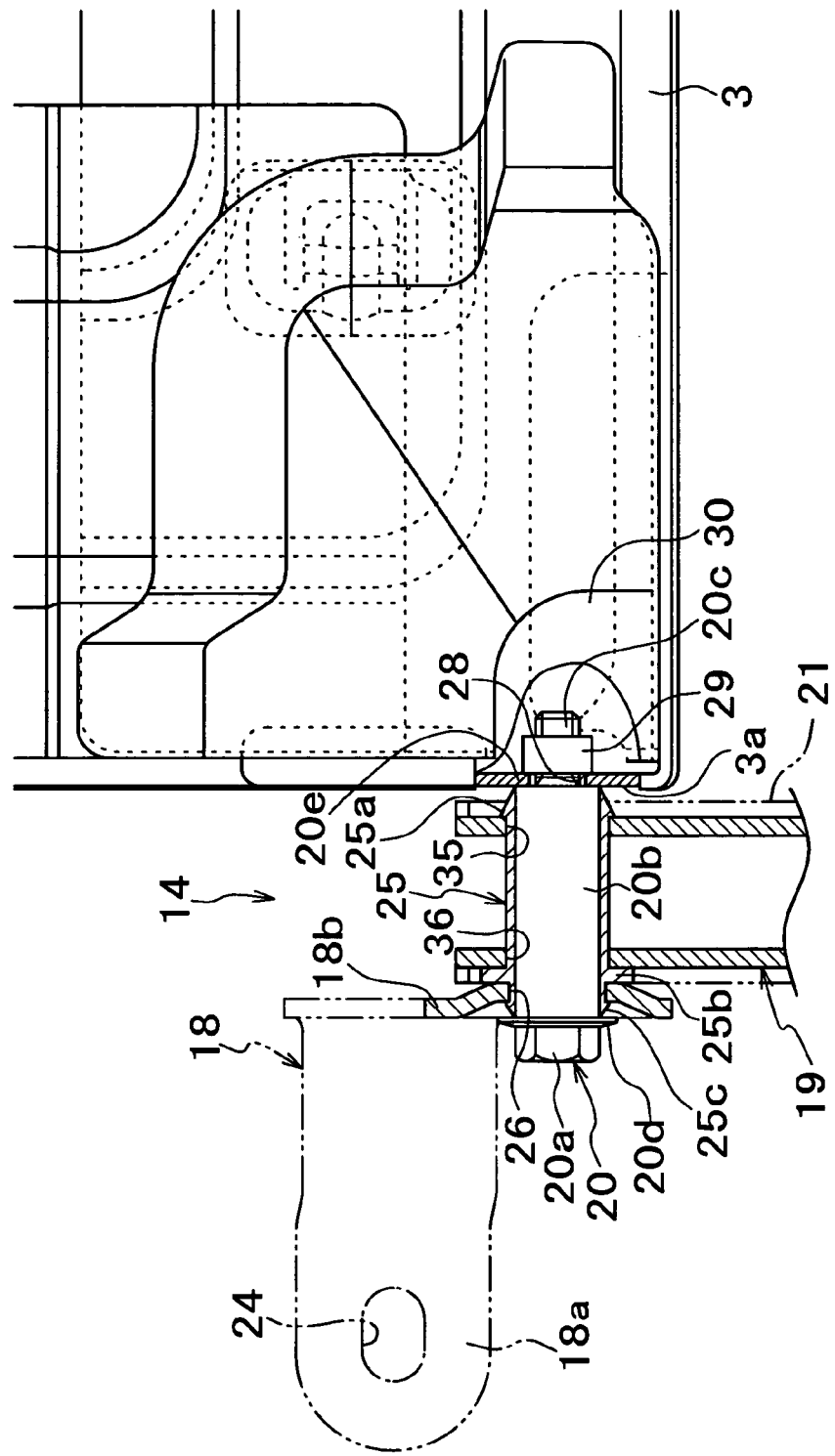
FIG. 5 is a sectional view showing a state in which a mounting bracket and a center hinge bracket are installed to a seat frame of a wider seat back of the seat backs shown in FIG. 1 via a hinge shaft, a collar, etc.
Figure 6:
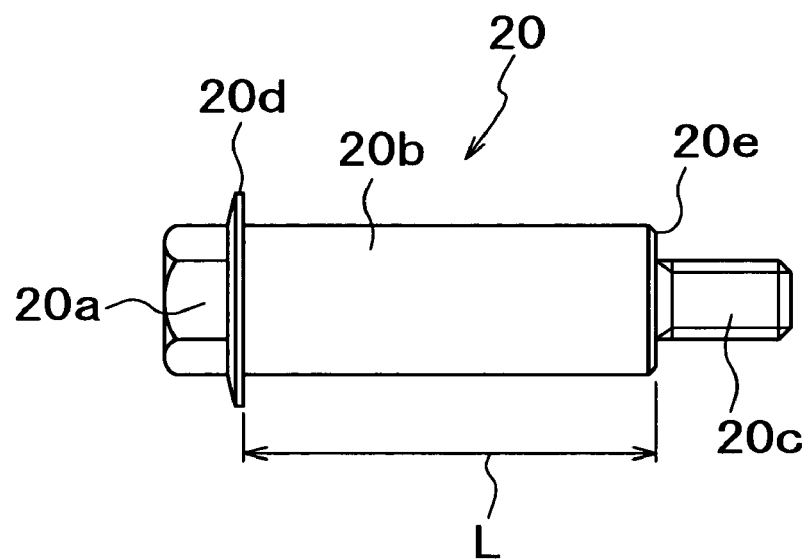
FIG. 6 is a side view of the hinge shaft shown in FIG. 5.
Figure 7:
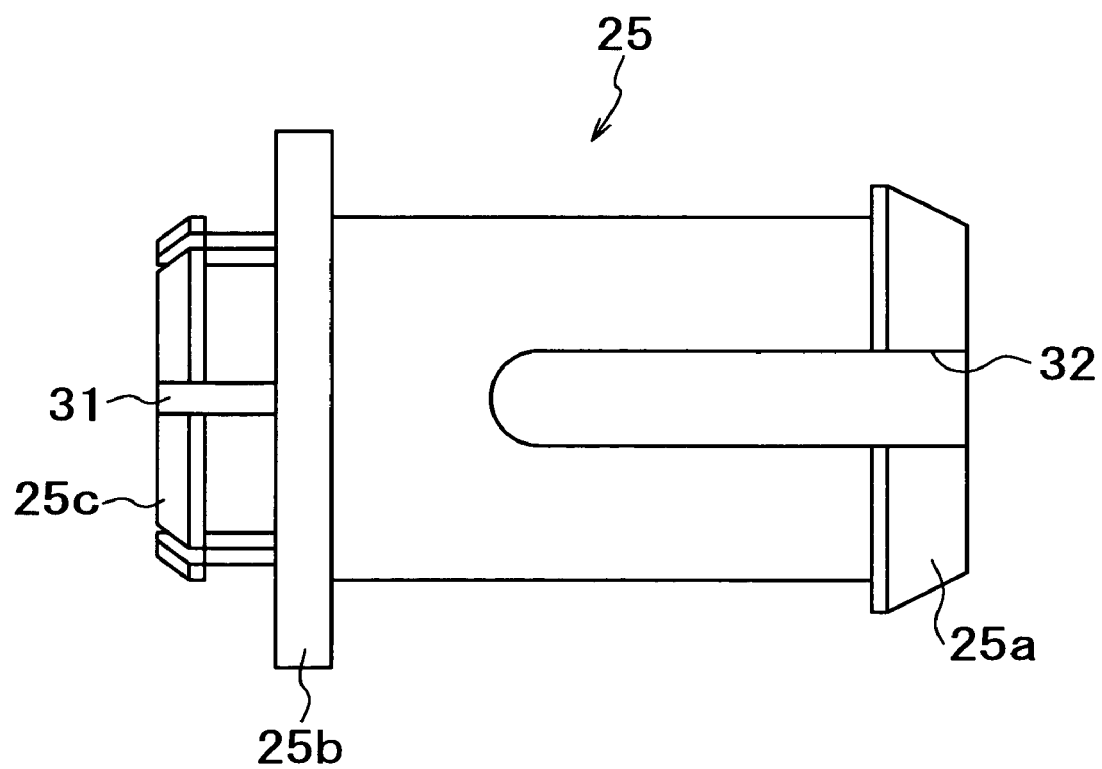
FIG. 7 is a side view of the collar shown in FIG. 5.

On the other hand, the inside (center side) in the vehicle width direction of the left and right seat backs 1 and 2 of this embodiment is installed to the center hinge 14 so as to be reclinable, by which the seat backs 1 and 2 can be reclined in the longitudinal direction of the vehicle. As shown in FIGS. 1, 3 and 5, in one end portion of the center hinge 14, there are provided a mounting bracket 18 installed to the right (one) seat back 2, the center hinge bracket 19 installed to the vehicle body floor (not shown) and the child seat attachment member 11, and a hinge shaft 20 for connecting the mounting bracket 18 to the center hinge bracket 19. The center hinge bracket 19 is covered by a resin-made decorative cover 21 having an external shape corresponding to the center hinge bracket 19. The lower side of the decorative cover 21 is fixed to the both right and left side surfaces of the opposed walls of the center hinge bracket 19 with screws 22.

The mounting bracket 18 is an L-shaped member formed by a mounting element 18a, which is arranged in the vehicle width direction and fixed to the back surface of the right seat back 2, and a support element 18b, which is arranged in the longitudinal direction of the vehicle and installed to the center hinge bracket 19. In the tip end portion of the mounting element 18a (one end portion of the mounting bracket 18), a bolt hole 24 which is elongated in the vehicle width direction and through which a tightening bolt 23 is inserted is provided. In the tip end portion of the support element 18b (the other end portion of the mounting bracket 18), an insertion hole 26 into which the hinge shaft 20 and a cylindrical collar 25 are inserted and installed is provided. At the inside position in the vehicle width direction of the seat frame 4 constituting the right seat back 2, a mounting hole 27 is formed so as to correspond to the bolt hole 24 in the mounting element 18a (see FIGS. 1 and 4).

As shown in FIGS. 1, 3, 5 and 6, the hinge shaft 20 is formed by using a shoulder bolt. Specifically, the hinge shaft 20 includes a head 20a on the proximal end side, a large-diameter portion 20b, which is a thick shaft located in an intermediate portion, and a small-diameter portion 20c, which is a thin shaft located on the distal end side. The small-diameter portion 20c is formed with external threads. Between the head 20a and the large-diameter portion 20b, a flange 20d projecting from the outer peripheral surface of the hinge shaft 20 is formed. The flange 20d plays, together with an annular flange (described later) of the collar 25, a role in preventing the mounting bracket 18 from coming off. Also, the boundary portion between the large-diameter portion 20b and the small-diameter portion 20c forms a shoulder 20e. The hinge shaft 20 is configured so that the shoulder 20e is in contact with the side surface of the seat frame 3 constituting the left seat back 1 in a state in which the hinge shaft 20 is tightened and fixed.

Accordingly, on the front surface of the seat frame 3 constituting the left seat back 1 is formed a mounting portion 3a in which a lower end corner portion projects toward the vehicle front. In the side surface on the inside in the vehicle width direction of the mounting portion 3a, a through hole 28 through which the small-diameter portion 20c of the hinge shaft 20 is inserted is provided. Also, on the back surface side corresponding to the through hole 28, a welded nut 29 that engages with the small-diameter portion 20c of the hinge shaft 20 is fixed. The mounting portion 3a is provided with a reinforcing member 30 which is formed so as to correspond to the peripheral shape and is installed to the seat frame 3 by welding. This reinforcing member 30 further increases the strength of the mounting portion 3a.

As shown in FIGS. 1, 3, 5 and 7, the collar 25 of this embodiment is formed into a cylindrical shape by a resin material having elasticity. The collar 25 is configured so as to rotatably support the large-diameter portion 20b of the hinge shaft 20 inserted therein. Moreover, the collar 25 is inserted through the insertion hole 26 in the support element 18b of the mounting bracket 18 and a hinge hole (described later) in the center hinge bracket 19 so as to be held by the center hinge bracket 19.

In the distal end portion of the collar 25 is formed a distal end claw 25a projecting to the outside, and in a portion close to the proximal end is formed an annular flange 25b projecting to the outside, so that the upper end portion of the center hinge bracket 19 can be held between the distal end claw 25a and the annular flange 25b. At the proximal end of the collar 25, a proximal end claw 25c projecting to the outside is formed. The insertion hole 26 in the support element 18b of the mounting bracket 18 is fitted between the proximal end claw 25c and the annular flange 25b, and the tip end of the support element 18b is held therebetween, by which the mounting bracket 18 can be held by the collar 25.

To rotate the hinge shaft 20 smoothly, the length of the collar 25 is made approximately equal to or shorter than the length L (see FIG. 6) from the flange 20d of the hinge shaft 20 to the shoulder 20e thereof. Moreover, to make it easy to insert the collar 25 through the insertion hole 26 in the support element 18b and the hinge hole (described later) in the center hinge bracket 19, the collar 25 is provided with a plurality of slits 31 and 32, extending in the axial direction, for increasing elastic deformation.

As shown in FIGS. 1 and 3, the center hinge bracket 19 of this embodiment extends in the vertical direction, and includes a hinge body 33 formed into a U shape in cross section in which the opening thereof is arranged at the rear of the vehicle, and a horizontally arranged flange portions 34 formed on both right and left sides by bending the lower end portion of the hinge body 33 substantially at right angles to the outside.

In the opposed walls formed in an upper end portion 33a of the hinge body 33, hinge holes 35 and 36 through which the hinge shaft 20 and the collar 25 are inserted are provided so as to be opposed to each other. Rear end portions on both right and left sides under the hinge holes 35 and 36 in the upper end portion 33a of the hinge body 33 are cut into a semicircular shape corresponding to the outer peripheral surface of the child seat attachment member 11, and are fixed by welding to the intermediate portion of the child seat attachment member 11. At the front and rear positions of the flange portion 34, insertion holes 38 into which tightening bolts 37 are inserted are provided. By tightening the flange portions 34 using the tightening bolts 37, the center hinge bracket 19 is fixed to the vehicle body floor (not shown). In the upper end portion of the decorative cover 21 as well, through holes 39 and 40 through which the hinge shaft 20 and the collar 25 are inserted are provided so as to correspond to the hinge holes 35 and 36. These through holes 39 and 40 are formed so as to have a diameter larger than the diameter of the annular flange 25b.

In the hinge construction in accordance with the embodiment of the present invention, the left and right seat backs 1 and 2 are installed by the procedure as described below. First, the center hinge bracket 19 of the center hinge 14 and the child seat attachment member 11 are fixed to each other by welding, and the decorative cover 21 is put on the center hinge bracket 19 and fixed to it with the screws 22. The reclining device 7, 8 and the support bracket 9, 10 are assembled in advance to the left and right seat backs 1 and 2.

Then, the tip end portion of the support element 18b of the mounting bracket 18 is pushed in between the annular flange 25b and the proximal end claw 25c of the collar 25 (engagement portion), by which the mounting bracket 18 is temporarily held by the collar 25. In this state, the collar 25 is inserted into the hinge holes 36 and 35 in the center hinge bracket 19 and the through holes 40 and 39 in the decorative cover 21, by which the mounting bracket 18 and the collar 25 are held by the center hinge bracket 19.

Next, the hinge shaft 20 is inserted into the collar 25, and the small-diameter portion 20c of the hinge shaft 20 is screwed in the welded nut 29 through the through hole 28 until the shoulder 20e comes into contact with the side surface of the seat frame 3 of the left seat back 1, and is tightened and fixed to the mounting portion 3a of the seat frame 3 (see FIG. 5). Then, the side bracket 12 of the child seat attachment member 11 is installed to the support bracket 9 with the bolt 15, and the side bracket 13 on the other side is installed to the support bracket 10 with the bolt 15. Thereafter, the tightening bolt 23 is screwed in the mounting hole 27 through the bolt hole 24 and is tightened, and thereby the tip end portion of the mounting element 18a of the mounting bracket 18 is fixed to the seat frame 4 of the right seat back 2, by which the inside (center side) portions in the vehicle width direction of the left and right seat backs 1 and 2 are connected to each other via the center hinge 14. By doing this, the left and right seat backs 1 and 2, the center flange 14, and the child seat attachment member 11 are assembled. Finally, the support brackets 9 and 10 and the center hinge bracket 19 are installed to the vehicle body floor (not shown). Thus, the left and right seat backs 1 and 2 are arranged in a state of being supported on the vehicle body side so as to be reclinable and capable of being turned in the longitudinal direction of the vehicle.

In the hinge construction in accordance with the embodiment of the present invention, the hinge shaft 20 is inserted through the insertion hole 26 in the support element 18b of the mounting bracket 18 and the hinge holes 36 and 35 in the hinge body 33 of the center hinge bracket 19, and is screwed in the welded nut 29 via the through hole 28, by which the hinge shaft 20 is directly tightened and fixed to the seat frame 3 of the left seat back 1, and thus the left and right seat backs 1 and 2 are connected to each other and supported so as to be turnable. Therefore, the installation strength of the left seat back 1 can be increased by the center hinge 14. Also, in the hinge construction of this embodiment, the support element 18b of the mounting bracket 18 is temporarily fixed to the center hinge bracket 19 by one hinge shaft 20 and the collar 25, and in this state, the mounting element 18a of the mounting bracket 18 is bolted to the seat frame 4 of the seat back 2, by which the center hinge 14 can be assembled. Therefore, a problem in that a tightening tool cannot be inserted in between the left and right seat backs 1 and 2 during the assembly work can be avoided, and the left and right seat backs 1 and 2 can be installed smoothly to the vehicle body.

The above is a description of the embodiment of the present invention. The present invention is not limited to the above-described embodiment, and various changes and modifications can be made. For example, although the left and right seat backs 1 and 2 are in a ratio of 6:4, they can be in any other ratio including 1:1.

The invention claimed is:

1. A seat back hinge construction comprising:

a center hinge to be provided between seat backs arranged by being divided into right and left, and said right and left seat backs to be supported by said center hinge so as to be reclinable, said center hinge including a mounting bracket of which one end portion to be installed to one seat back, a center hinge bracket to be installed to a vehicle body, and a hinge shaft for connecting said mounting bracket to said center hinge bracket;

said right and left seat backs to be supported via said center hinge so as to be turnable by inserting said hinge shaft through the other end portion of said mounting bracket and said center hinge bracket and by fixing said hinge shaft to a seat frame of the other seat back;

the other end portion of said mounting bracket and said center hinge bracket each are provided with a through hole through which a cylindrical collar is installed, and said hinge shaft is arranged by being inserted in said collar;

said collar is formed with an engagement portion for holding the other end portion of said mounting bracket;

the mounting bracket is held on the engagement portion on the end of the collar, and the hinge shaft is inserted through the installation bracket and is then directly installed to the seat frame;

wherein said hinge shaft is formed by a shoulder bolt having a large-diameter portion and a small-diameter portion, and is configured so that a shoulder is in contact with the side surface of a seat frame of said seat back in a state in which said hinge shaft is tightened and fixed; and wherein a child seat attachment member extending in the transverse direction is fixed to said center hinge bracket.

2. The hinge construction for a seat back according to claim 1, wherein said right and left seat backs are in a different division ratio, and the other seat back is formed so as to be wider than one seat back.

* * * * *